United States Patent [19]

McFerrin et al.

[11] Patent Number: 5,142,515
[45] Date of Patent: Aug. 25, 1992

[54] SECTOR SLIP WITH ADDRESS COLLISION RECOVERY FOR WRITE ONCE RECORDING MEDIA

[75] Inventors: William P. McFerrin, Woodland Park; Randal C. Hines, Colorado Springs, both of Colo.

[73] Assignee: North American Philips Corporation, New York, N.Y.

[21] Appl. No.: 434,794

[22] Filed: Nov. 13, 1989

[51] Int. Cl.⁵ ............................................. G11B 27/36
[52] U.S. Cl. ............................................. 369/32; 369/54
[58] Field of Search .................. 369/32, 54, 58; 360/31

[56] References Cited

U.S. PATENT DOCUMENTS

| | | | |
|---|---|---|---|
| 4,606,016 | 8/1986 | Verboom et al. | 369/58 |
| 4,768,181 | 8/1988 | Ichinose et al. | 369/58 |
| 4,788,672 | 11/1988 | Toyooka et al. | 369/32 |
| 4,821,254 | 4/1989 | Satoh et al. | 369/58 |
| 4,831,611 | 5/1989 | Sasaki et al. | 369/58 |
| 4,835,757 | 5/1989 | Abiko | 369/58 |
| 4,849,956 | 7/1989 | Aizawa | 369/58 |
| 4,920,528 | 4/1990 | Sakamoto et al. | 369/58 |
| 4,941,139 | 7/1990 | Kulakowski et al. | 369/54 |
| 4,949,326 | 8/1990 | Takagi et al. | 369/54 |
| 4,958,337 | 9/1990 | Yamanaka et al. | 369/54 |
| 4,969,139 | 11/1990 | Azumatani et al. | 369/58 |
| 4,980,878 | 12/1990 | Szerlip | 369/58 |

Primary Examiner—Donald McElheny, Jr.
Attorney, Agent, or Firm—David R. Treacy

[57] ABSTRACT

A method and an apparatus for storing data on a high speed write-once recording media such that random writes and fast random accesses are possible. Writes are verified by decoding reflections of write pulses from the recording media, and comparing the decoded data with intended data. The recording media is divided into a plurality of bands. When a write for a sector of a band is rejected during verification, sector slip occurs and an attempt is made to rewrite the data in a next sequential sector of the band. When more than a predetermined number of slips have occurred in a band or a data collision occurs, the data is written in a preallocated spares area of the recording media.

14 Claims, 10 Drawing Sheets

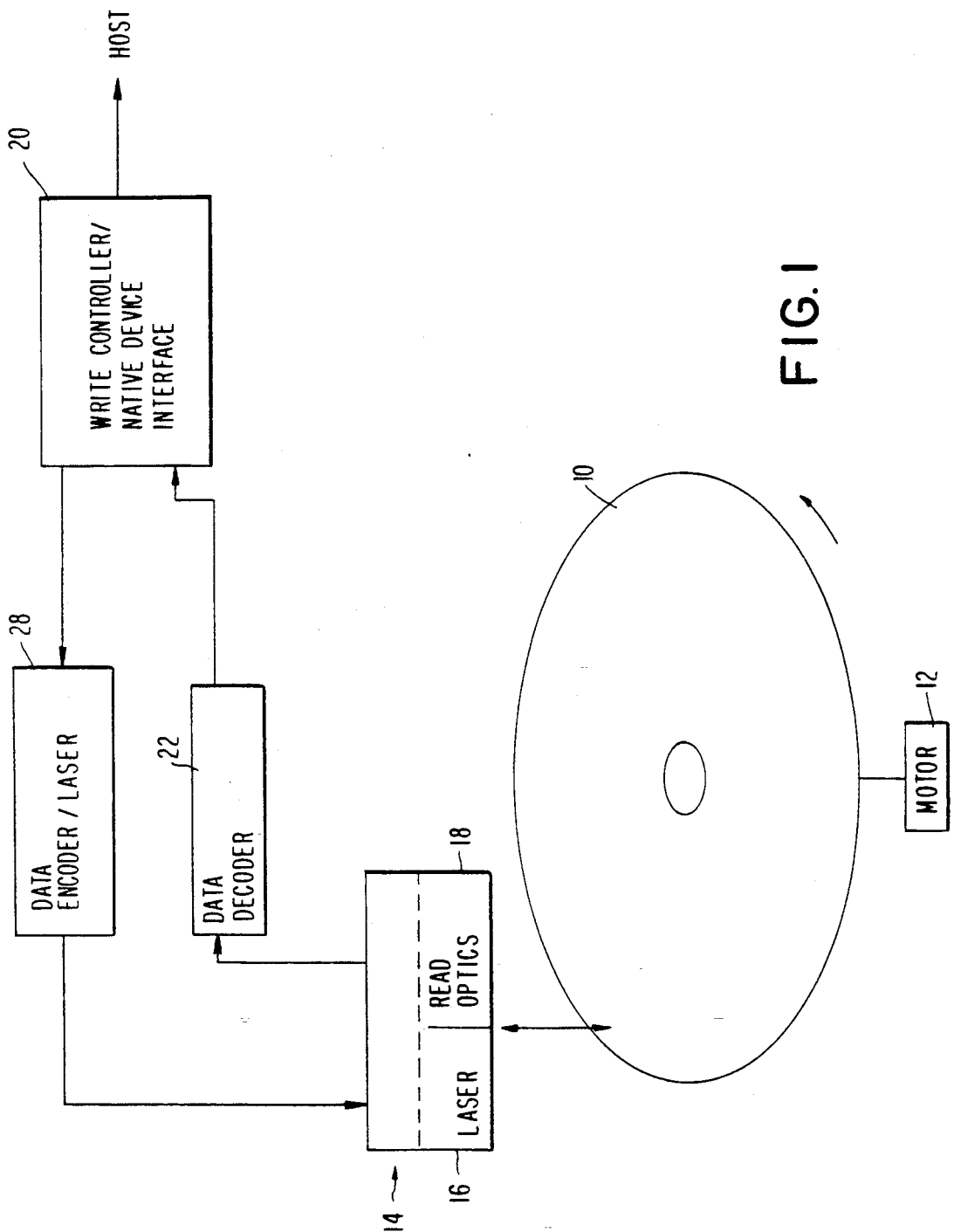

| SEGMENT | BYTE | DATA | FUNCTION |
|---|---|---|---|
| 0 | 0 | MIF | SECTOR MARK |
| | 1 | 00-0xff | SECTOR ADDRESS |
| | 2 | 00-0xff | TRACK ADDRESS msb |
| | 3 | 00-0xff | TRACK ADDRESS lsb |
| | 4 | 0xff-00 | !(TRACK ADDRESS lsb) |
| | 5 | 0xff-00 | !(TRACK ADDRESS msb) |
| | 6 | 0xff-00 | !(SECTOR ADDRESS) |
| | 7-9 | ---- | GAP (HEADER VERIFICATION) |
| | 10-11 | 0x4949 | BLOCK WRITE START FIELD |
| | 12-13 | ---- | GAP (BWS VERIFICATION) |
| | 14-15 | ---- | RESERVED |
| | 16-17 | —— | SERVO BYTES |
| 1-71 | 0-15 | xxxx | RECORDABLE FIELD |
| | 16-17 | —— | SERVO BYTES |

FIG. 6

| CODEWORD | MESSAGE | ECC BYTES |
|---|---|---|
| CODEWORD [c1] | 206 DATA BYTES | 16 PARITY BYTES |
| CODEWORD [c2] | 206 DATA BYTES | 16 PARITY BYTES |
| CODEWORD [c3] | 206 DATA BYTES | 16 PARITY BYTES |
| CODEWORD [c4] | 206 DATA BYTES | 16 PARITY BYTES |
| CODEWORD [c5] | 200 DATA BYTES<br>1 BYTE LDI200<br>1 BYTE RESERVED<br>4 BYTES CRC | 16 PARITY BYTES |
| CODEWORD [cr] | 14 CONTROL BYTES | 12 PARITY BYTES |

FIG. 7

| BYTE | FIELD | DESCRIPTION |
|---|---|---|
| 0-1 | ess | EXTENT STATUS OF SECTOR: 3000=FIRST SECTOR OF WRITE 0x4000=INTERMEDIATE SECTOR OF WRITE 0x2000=LAST SECTOR OF WRITE |
| 2 | vol | LD1200 COMPATIBILITY |
| 3-4 | nrs | NUMBER OF SECTORS REMAINING FOR THIS WRITE TRANSACTIONS |
| 5-7 | lsa | LOGICAL SECTORS ADDRESS |
| 8-10 | ipa | INTENDED PHYSICAL ADDRESS |
| 11-13 | nsa | NEXT SPARES ADDRESS AVAILABLE |

FIG. 8

| BYTE | FIELD | DESCRIPTION |
|---|---|---|
| 0-1 | crt | CONTROLLER RECORD TYPE = 0x0100 |
| 2-4 | nrs | NUMBER OF SECTORS REMAINING TO WRITE FOR THIS REQUEST |
| 5-7 | lsa | LOGICAL SECTOR ADDRESS |
| 8-10 | ipa | INTENDED PHYSICAL ADDRESS |
| 11-13 | nma | NEXT MAP ADDRESS AVAILABLE |

FIG. 9

| BYTE | FIELD | DESCRIPTION |
|---|---|---|
| 0-1 | crt | CONTROLLER RECORD TYPE = 0x0200 |
| 2-4 | lpa | LAST PHYSICAL ADDRESS OF RELOCATED SECTOR, 0xffffff IF NONE |
| 5-7 | lsa | LOGICAL SECTOR ADDRESS |
| 8-10 | ipa | INTENDED PHYSICAL ADDRESS |
| 11-13 | nma | NEXT MAP ADDRESS AVAILABLE |

FIG. 10

| BYTE: | FIELD: | DESCRIPTION: |
|---|---|---|
| 0-1 | crt | CONTROLLER RECORD TYPE = 0x0400 |
| 2-4 | lma | LOGICAL ADDRESS IN MAP SPACE |
| 5-7 | ipa | INTENDED PHYSICAL ADDRESS |
| 8-10 | lum | PHYSICAL ADDRESS OF LAST FULL MAP GROUP (0xffffff IF THERE IS NONE) |
| 11 | nre | NUMBER OF MAP ENTRIES IN THIS SECTOR |
| 12-13 | nrg | NUMBER OF MAP ENTRIES IN THIS MAP GROUP |

FIG. 11

SECTOR SLIP WITH ADDRESS COLLISION RECOVERY FOR WRITE ONCE RECORDING MEDIA

BACKGROUND OF THE INVENTION

1. Field of the Invention

The present invention relates to an apparatus and a method for writing data onto a recording media, and more particularly, for writing data at high speeds onto a write-once recording media from which data will be read at high speeds.

2. Description of the Related Art

Over the last decade, there has been an ever-increasing demand for recording media having larger and larger amounts of storage capacity. One solution to this demand has been the so-called write-once recording media (WORM), such as optical disks. Data on an optical disk is stored in the form of a series of pits formed in the surface of the disk. WORMs are especially useful in applications where the data base is extremely large but relatively static, such as the Library of Congress book cataloging data or the U.S. Geological Survey's data of the topography of the United States, as WORMs can store in excess of two gigabytes of data on a single surface.

In view of the amount of data being stored on such media, efficient media management is essential. Media management systems for WORMs that have been introduced to date are relatively simple. The rotation rates of these WORMs during reading and writing is relatively slow, with the fastest of these WORMs being rotated at approximately eight revolutions per second (rps). Accordingly, devices that write data onto and read from such media function at relatively low data transfer rates and require media management techniques, need only be effective at these rates. However, computers are being introduced which process data at greater and greater rates. Personal computers are now being developed that will process data at many times the one to two million instructions per second (MIPS) rates now available in top-of-the line personal computers, and it is expected that computers that process data at 100 MIPS may soon become common. Storage media must be developed which can be read at sufficient speeds so as to satisfy the data transfer requirements of these faster computers.

When writing data onto WORMs, such as optical discs, at the relatively low speeds, it is actually possible for the writing device to watch and read the pits being formed by a laser in the surface of the WORMs. This is known as direct read during write (DRDW). Accordingly, during a write operation, a write controller can almost instantly determine whether the data written was the same as the data intended to have been written. However, present writing devices cannot watch the pits being formed at the reading and writing speeds required for the new faster computers. This loss of a valuable quality control tool is a major impediment to the development of higher speed WORMs.

Random access to the WORMs during the write process is a desirable feature. Data can be written on WORMs at predetermined addresses of the WORMs, which speeds up recall of data. Blank areas can be left to enable future updating of data. If the media management technique used for a WORM does not permit random access and changes to the database contained on the WORM are desired, the WORM must be replaced or supplemented. Supplementing a WORM requires a secondary storage media and some combination of additional software, additional hardware, and machine instructions to provide access for a user to the secondary storage media. These options are expensive and/or time consuming. Clearly, a media management technique which permits random access is desirable, as it would permit future updating and greater latitude when performing the initial write on a WORM. Thus, a need exists for a media management system which allows random access during a write operation to a high-speed WORM.

Any media management system must also take into account defects encountered during writing. Media defects may economically be determined only as the media is being written. Defects can be caused by gouges or other defects in the media surface itself, by dust which has accumulated on the media surface or which otherwise interferes with the laser beam during the write, or by vibrations during the write. Typically, less than 0.3 percent of addressable areas of a media surface will be declared defective. However, given the total number of addressable areas on a typical WORM, the number of defective areas will be large and poses a problem that must be addressed.

Efficiency is another important criteria for media management. The media management system must be designed so that an optimum average transfer rate performance is achieved, and a minimum spin up time is required for the WORM. In accessing data, the actual physical address is thousands of addresses away from its logical address as perceived by the host, an adequate system must be in place so that the data can be accessed quickly and efficiently. Otherwise, relatively large quantities of time are used to find the physical address. Additionally, given the demands for storage space outlined above, media utilization should be as efficient as possible.

One proposed method of media management is directed to dealing with media defects. When a defect is found in a first addressable area on the surface of the media during a write operation, a "slip" to a next addressable area of the media is performed. That is, when a defect is found in a first addressable area of the media, such as a surface defect or an incorrect write, the controller attempts to write the data meant for the first addressable area in the next addressable area. This system of media management has the highest media utilization efficiency, since the only media cost is for replacements. However, such a system is effective when a sequential write is being performed, and would be difficult to implement when random access to all sectors is desired. Given that the surface of a media may contain over two million physical addresses, and given the typical defect rate of 0.3 percent, the "physical" address of data being written can be thousands of addresses away from its "logical" address (the address to which the data was directed). Such differences would severely effect the data recovery efficiency in a random access system, as finding the required data would take an inordinate amount of time. However, after a read is started, the read access efficiency for one area in the portion to be read is very high, as the data will be found in the next sequential area of the WORM if the first area is defective (if the next area is not defective).

Another media management technique currently in use for the relatively slow WORMs preallocates portions of a WORM for replacement of defective areas. The replacement portions may be distributed over the WORM so as to provide fast access. When a defect is detected, a predetermined method is imposed by which the replacement portions of the WORM are utilized. Since the allocation of replacements can have no specific relationship to the distribution of defects, then some written relocation table must be utilized so that this variation can be tracked for reading. The maintenance of this table carries some impact on the media utilization efficiency. The area available for this maintenance should be chosen to match the maximal number of anticipated defects. The physical reference to each preallocated replacement is divided into two disjoint sets: the defect replacement set and the relocation table space.

Such a media management technique provides contiguous logical address space and random access to all sectors. However, media utilization cannot be 100%, since even if the area reserved for defects is equal to the area containing defects on a particular WORM, additional space is required on the WORM for mapping these replacements. Further, replacement access efficiency is low, as the defective (intended) area must be read, then the mapping area corresponding the defective area which indicates the location of the replacement area must be read, and finally the replacement area itself must be read. As these areas are not likely to be contiguous, several rotations of the WORM are likely to be necessary.

To date, no media management technique for high speed WORMs has been introduced which permits random access during both reading and writing, has high replacement access efficiency, and high media utilization efficiency.

SUMMARY OF THE INVENTION

Accordingly, it is an object of the present invention to provide a method which permits random access of a recording media during writing.

It is a further object of the present invention to provide media management technique for high speed recording media which provides both high replacement access efficiency and high media utilization efficiency.

Yet another object of the present invention is to provide a recording media which uses a media management technique which achieves optimum average transfer rate performance.

Yet another object of the present invention is to provide a media management technique which provides reduced spin-up time for a recording media.

A further object of the present invention is to provide a media management technique for recording media which realizes host-initiated reallocation of space on the media.

To achieve the foregoing objects and in accordance with the purpose of the invention, as embodied and broadly described herein, a method for writing data onto a recording media is provided which comprises the steps of: (1) determining whether a sector of the recording media to be written with data contains any previous write; (2) writing the data in a spares area and generating a map therefor when the sector contains any previous write; (3) writing the data onto the sector and determining whether the sector contains an acceptable number of errors during the write when the sector contains no previous write; (4) repeating the method in a next sector for next data when the sector is determined to contain an acceptable number of errors; and (5) slipping to a next sequential sector when the sector is determined not to contain an acceptable number of errors in the third step and repeating the method to attempt to write the data onto the next sequential sector.

Preferably, the errors being counted include write errors and recording media defects. With respect to a further step, prior to the first step: (6) a first sector to be written is pre-qualified as blank during a write transaction in which a plurality of data is to be written into respective sequential sectors.

The first step may include the substeps of: determining whether the sector contains an indication of a previous write; proceeding to the third step if no indication is found; reading the sector to determine if data has been written in the sector if the sector contains an indication of a previous write; proceeding to the second step if data has been written in the sector; determining whether a logical overwrite is being attempted if the sector has not been written in; aborting the writing if it determined that a logical overwrite is being attempted; and proceeding to the third step if it is determined that a logical overwrite is not being attempted.

Preferably, the recording media is divided into a predetermined number of bands, each of the bands having a predetermined number of sectors, and the method further comprises the step of: (7) quantifying the number of slips in the band to be written prior to the first step, wherein the fifth step further comprises proceeding to the second step of writing the data in the spares area when the number of slips exceeds a predetermined number. The fifth step may further comprise counting the number of consecutive slips and proceeding to the second step of writing data in the spares area when the number of consecutive slips equals a predetermined number. Alternatively, the fifth step may further comprise counting the number of consecutive slips and aborting the write when the number of consecutive slips equals a predetermined number.

The second step of writing the data in the spares area may comprise the substeps of: (1) obtaining an address of a next available sector in the spares area; (2) writing the data in the next available sector in the spares area and determining whether the next available sector contains an acceptable number of errors; (3) when the next available sector does not contain an acceptable number of errors, repeating the second substep for the data in a next sequential sector in the spares area; and (4) when the next available sector contains an acceptable number of errors, repeating the second substep for next data, if any, in the next sequential sector in the spares area.

The method may further comprise the step of, prior to the third step: (8) writing an overwrite protection indicator into a portion of the sector for a first sector to be written in a writing transaction. Additionally, the method may further comprise the step of, when no data has been written in the spares area: (9) post-qualifying a predetermined number of consecutive sectors following a last sector written during a write transaction.

An apparatus for carrying out the method comprises: a device for determining whether a sector of the recording media to be written contains previously written data; a device for writing data on the sector of the recording media and detecting defects in the sector and the data being written; and a device for moving the recording media relative to the writing and detecting device so that the writing and detecting device attempts to write the data into a next sector when the sector is detected as being defective, and attempts to write the data in a spares area of the recording media when the determining device determines that the sector contains previously written data.

The apparatus may further comprise a device for generating a map entry and writing the map entry onto a predetermined sector of the recording media when the determining device determines that the sector of the recording media to be written onto contains previously written data and the moving device moves the recording media relative to the writing and detecting device so as to write the data in the spares area.

The recording media can be divided into a predetermined number of bands, each of the bands containing a predetermined number of sectors. Further, the apparatus may further comprise means for counting the number of times the moving device has moved the recording media relative to the writing and detecting device for attempting to write the data into a next sector in a given band, and causing the moving device to move the recording media relative to the writing and detecting means so that the writing and detecting device attempts to write the data in the spares area when the count exceeds a predetermined number.

Other objects and advantages of the present invention will be set forth in part in the description and drawings which follow, in which like reference numbers represent like parts throughout, and, in part, will be obvious from the description, or may be learned by practice of the invention.

BRIEF DESCRIPTION OF THE DRAWINGS

FIG. 1 is a schematic view of a recording media and reading/writing apparatus according to the present invention;

FIG. 6 is a diagram illustrating the formatting of a 72-segment portion of the recording media;

FIG. 7 is a diagram illustrating the form in which data is stored in a sector of the recording media;

FIG. 8 is a diagram of the format of a controller record for a host area sector;

FIG. 9 is a diagram of the format of a controller record for a spares area sector used for collision recovery;

FIG. 10 is a diagram of the format of a controller record for a spares area sector used for relocation;

FIG. 11 is a diagram showing the format of a controller record for a map sector;

DESCRIPTION OF THE PREFERRED EMBODIMENT

Figure 2A:
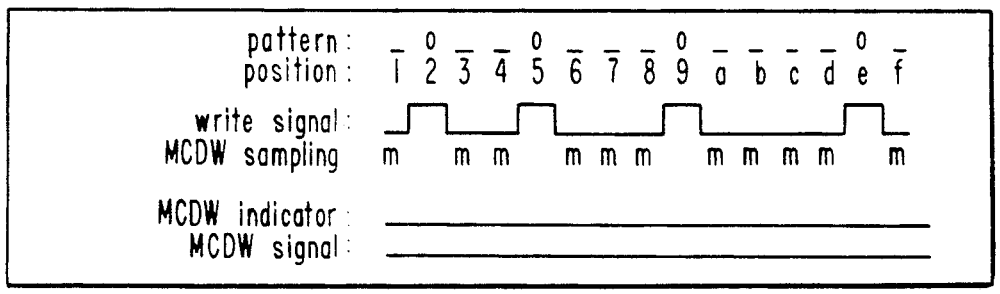
FIG. 2A is a diagram of media certification during write for an unflawed area of the recording media.

Reference will now be made in detail to the present preferred embodiment of the invention, examples of which are illustrated in the accompanying drawings.

FIG. 1 is a schematic drawing of a system for writing on a recording media with which the present invention can be carried out using the appropriate software. A write-once recording media (WORM) 10 for storing data, such as an optical disk, is rotatable by a motor 12. In high speed applications, the motor 12 will rotate the recording media 10 at relatively high speeds, such as 16 ⅔ revolutions per second (rps). A write controller 20 controls a read/write assembly 14 for writing data onto and reading data from the recording media 10. The read/write assembly 14 is movable relative to the center of the recording media 10 by a servomechanism (not shown). The motor 12 and the servomechanism operate in tandem to position the read/write assembly 14 over the required portion of the recording media 10 in cooperation with the write controller 20 by methods known in the art.

The read/write assembly 14 includes a laser 16 for generating a laser beam. The laser 16 performs several functions and operates at two different intensities. Typically, when the write-once recording media 10 is an optical disk, data is recorded on the WORM 10 as a series of pits. The pits are formed in the WORM 10 by a write pulse from the laser 16, which is a laser pulse having a relatively high first intensity. When the laser 16 operates at a relatively low second intensity, pits will not form in the surface of the recording media 10, as the intensity of the laser beam at the second intensity is not strong enough to form pits. Rather, the second intensity is used for reading data from the WORM 10. The reflection of a laser beam from a pit in the recording media 10 has different characteristics than the reflection of a laser beam from a regular surface of the recording media 10. Optics 18 of the read/write assembly 14 detect the reflected laser light, which is decoded in data decoder 22. The decoded data is then forwarded for use as required by the computer (not shown).

At high rotation speeds, conventional media management techniques, such as direct read during write (DRDW) are not effective. As discussed above, due to the high channel rates (data throughout speeds) it is not presently feasible for the reading mechanism to directly observe each forming pit as the intensity of the laser beam drops from the write pulse to the reading intensity. By reading the data from a WORM as it was being written and comparing the read data with the data intended to have been written, a simple and highly accurate writing system was possible. The present invention proposes to replace DRDW as follows.

In order to assure a high accuracy writing system, a high speed data verification technique had to be provided. A technique known as data verification during write (DVDW), which is described in greater detail in co-pending U.S. patent application Ser. No. 07/428,106, filed Oct. 27, 1989, entitled "Apparatus And Method For Verification Of Data Established On A Record Carrier During Write" and assigned to the same assignee, is one such technique. While at the newly required speeds it is not possible to read the pits as they are being formed, it is possible to monitor the intensity of the laser beam being produced by the laser. To form a pit having desired characteristics in the surface of the recording media 10, a laser beam having a certain intensity is required over a known period of time. Accordingly, by monitoring the laser intensity, it is possible to detect the data the laser is writing. It follows that a write can be verified with a high degree of certainty by comparing data obtained while monitoring laser intensity to data intended to have been written. Accordingly, the optics 18 in the read/write assembly 14 also monitors each write pulse generated by the laser 16. Assuming that a write pulse of sufficient strength forms a pit, the optics 18 detect whether a pulse of sufficient strength to form a pit is reflected from the surface of the recording media 10 during a write. By monitoring the laser intensity, the optics 18 detects each byte of data, which it has sensed should have been written on the surface of the recording media 10, and transmits this sensed data to the write controller 20 via the data decoder 22. The write controller 20 stores data representative of the data intended to have been written, which was previously sent to the read/write assembly 14 via a data encoder 26. The write controller 20 then carries out a byte-by-byte comparison of the detected byte and the intended byte. If a match is not found, an error signal will be generated.

Another technique used by the present invention takes advantage of the fact that the laser 16 is kept on at all times during the write operation in order to prolong the life of the laser 16. The write controller 20 and the data encoder/laser control circuit 28 control the intensity of the laser 16 based on data to be recorded in the recording media 10. When a pit is to be formed in the recording media 10, the write controller 20 and the data encoder 28 cause the laser 16 to produce a high intensity write pulse, which is directed at a desired location on the surface of the recording media 10 in order to burn a pit into the recording media 10 at the desired location. When the laser 16 has been maintained at the high intensity long enough to burn a pit having the proper configuration in the surface of the recording media 10, the data encoder/laser control circuit 28 ends the write pulse, and the laser 16 returns to producing the read or low intensity second beam. The read intensity is maintained whenever the laser 16 is not producing the high intensity beam.

The present invention utilizes the above characteristic to perform media certification during write (MCDW) for uncovering defects in the recording media 10, which is described in greater detail in co-pending U.S. patent application Ser. No. 07/428,167, filed Oct. 27, 1989, entitled "Apparatus And Method For Certification Of A Record Carrier During Write" and assigned to the same assignee. When the laser 16 is not being used to write, the optics 18 of the read/write assembly 14 monitor the surface of the recording media 10 for defects between write pulses. That is in every given area of the recording media 10, the optics 18 receive the reflection of the low intensity laser beam off of the recording media 10 between positions at which the laser is forming pits in the area. This received data is sent to the write controller/native device interface 20. If the surface of the recording media 10 between intended pit positions is blank and not otherwise disfigured, the reflections received by the optics 18 from these non-pit positions should have known normal characteristics. When the reflections from all of such position in the given area of the recording media 10 have these normal characteristics, that area of the recording media 10 is considered certified. An area which is certified is illustrated in FIG. 2A. FIG. 2A illustrates an area of the surface of the recording media 10 which consists of 15 positions. Of these 15 positions, it is intended that pits be formed at positions 2, 5, 9 and e. During the write in this area, high intensity write pulses from the laser 16 are used to form pits at positions 2, 5, 9 and e. The reflection from the low intensity beam is read for the positions in the area between the intended pit positions. Since the pattern is blank at these positions (no pits and/or surface disfigurations), this area of the media is certified, and no MCDW signal is generated indicative of a defective area.

Figure 2B:
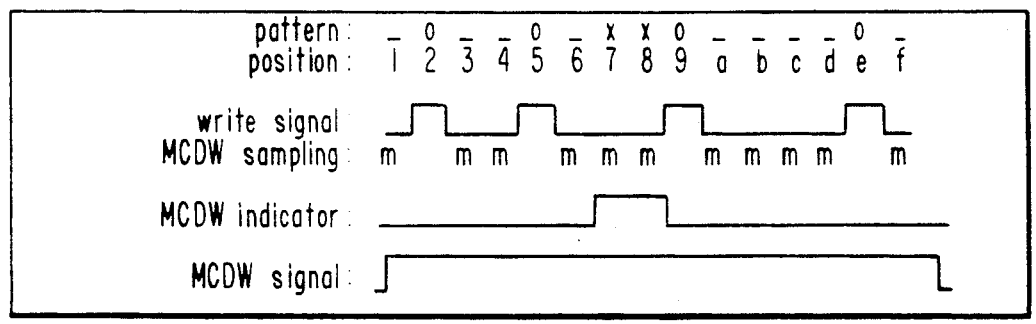
FIG. 2B is a diagram of media certification during write for a flawed area of the recording media.

In contrast, FIG. 2B illustrates an area in which an identical write is carried out, but during the write defects of some type are detected at positions 7 and 8. Accordingly, the MCDW indicator goes high for these positions, and an MCDW signal indicative of a defect in that area of the surface of the recording media 10 is generated.

The media management scheme of the present invention will now be described beginning with a reference to FIGS. 3-14.

In order to obtain the most efficient storage system, the recording media 10 is divided into a plurality of individually addressable regions, each region being subdivided at least twice more. Each addressable region and subdivision thereof consists of a contiguous continuous portion of the recording media 10.

Figure 3:
FIG. 3 schematically illustrates a first division of the surface of the recording media according to the present invention.
Figure 4:
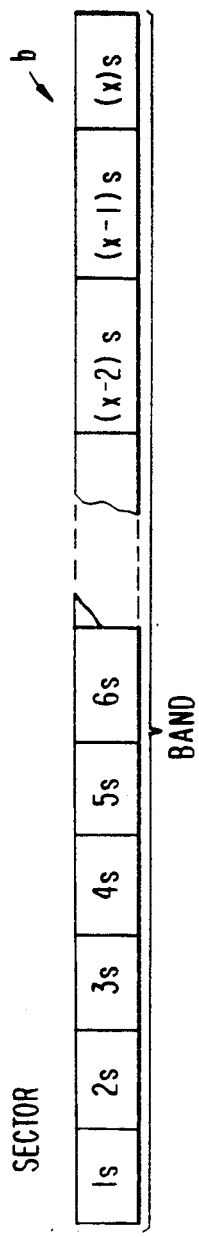
FIG. 4 illustrates a second division of the surface of the recording media according to the present invention.
Figure 5:
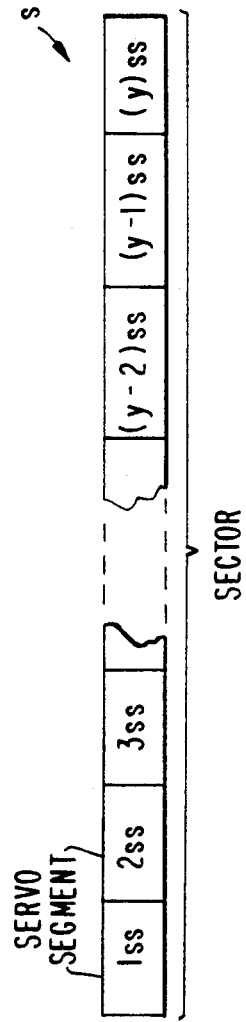
FIG. 5 illustrates a third division of the surface of the recording media according to the present invention.

Bands are the highest order of these regions. Each band is individually addressable, and consists of a continuous surface portion of the recording media 10. As illustrated in FIG. 3, the recording media 10 is divided into a plurality of bands $1b, 2b, \ldots, (n)b$, for a total of n bands. As illustrated in FIG. 4, each band b is separated into a plurality of sectors $1s, 2s, \ldots, (x)s$. A total of x sectors constitute each band. The lowest order division of the recording media 10 is the servo segment. As illustrated in FIG. 5, each sector s is divided into a plurality of servo segments $1ss, 2ss, \ldots, (y)ss$, for a total of y servo segments (segments).

The combination of the band number, sector number, and segment number designates a specific portion of the surface of the recording media 10. For illustrative purposes, it will be assumed that the surface of the recording media 10 is divided into 128 bands, each band being divided into 16,448 sectors, each sector containing 72 segments. In each segment, 18 bytes of data (16 recordable bytes and 2 servo bytes) can be recorded.

As discussed above, both the "slip" technique and the preallocation technique of media management have certain advantages and disadvantages. Generally, these are the opposite for each technique. The present inventors have found a way to combine these two techniques, so as to obtain a media management technique which provides random access to the WORM during both reading and writing, high replacement access efficiency, and high media utilization efficiency. In doing so, the inventors had to overcome the very real possibility of data collisions that could result when random writes and slipping are both permitted. This technique is discussed below.

The sector is the smallest addressable portion of the media surface. Since 0.3% of the sectors on the surface of the recording media can be expected to be defective, a portion of the surface of the recording media 10 is dedicated for defective sectors and reallocations. Given that each band is divided into 16,448 sectors, and that 0.3% of the sectors for any given band are expected to be defective, in a band having typical defects, the average maximum slip between logical and physical addresses in the band is 49 sectors. The last 64 sectors in each band are reserved for realignment of any such slip in order to prevent the slip from propagating across the media surface and to maximize media utilization. If the sectors in the reserved realignment area do not exhaust the slip, data intended to be recorded in sectors within the band is forwarded to reserve sectors in a preallocated spares area of the recording media 10.

The layout of a typical sector is illustrated in FIG. 6. The first segment of the sector, segment 0, is reserved for control purposes. In segment 0, bytes 0–6 are preformatted to indicate the sector address. Bytes 7–9 are left blank to allow drive electronics sufficient time to verify the sector address. Bytes 10–11 of segment 0 are reserved for a block write start flag. At the beginning of any write transaction, a block write start flag is written into these bytes of the first sector to be written. Before writing into each sector, these bytes of the respective segment 0 are checked for the existence of the block write start flag, as will be explained later. Bytes 12 and 13 are reserved to give the drive electronics time to verify the block write start flag, while bytes 14 and 15 are reserved. Bytes 16 and 17 hold servo data. The recordable fields for each sector are found in segments 1 through 71. Bytes 16 and 17 of segments 1-71 are reserved for servo data, leaving bytes 0–15 (1136 total bytes) for recording data.

The 1136 bytes of data to be recorded are protected by an interleaved Reed-Solomon code composed of five data code words, C1, C2, C3, C4, C5, and one control code word, the controller record CR. Interleaving will normally be carried out in the write controller/native device interface 20. Data code words C1, . . . ,C5 are physically interleaved across the 71 segments, and the controller record CR is physically interleaved with the five data code words. Interleaving of the code words and the controller record is performed by known interleaving techniques. The breakdown of the data contained in the five code words C1, C2, C3, C4, C5 and the controller record CR is illustrated in FIG. 7. Each code word contains 222 bytes, including 206 data bytes and 16 parity bytes, except for the code word C5, which contains 200 data bytes, 16 parity bytes, one byte for compatibility with other disc devices, one byte reserved for future use, and four bytes which protect the code words C1, C2, C3, C4, C5. The controller record CR includes a total of 26 bytes, including 14 recordable control bytes and 12 parity bytes. Thus, a single sector can store 1,024 bytes of data from the database to be stored.

The controller record CR takes on one of four different formats, depending on the location of the sector. FIG. 8 illustrates the controller record CR for a sector located in the data recording (host) area of a band of the recording media 10. Of particular importance are bytes 5–10. Bytes 5–7 contain the actual physical address of the sector in the recording media. Bytes 8–10 of a sector always contain the physical sector address of the sector of data (the logical sector) which was intended to have been written at that address. When sector slip has occurred somewhere earlier in the band, that is, when due to a defect in the surface of the recording media 10, the write controller will write a sector of data in a physical address different from the logical address to which it was intended. Thus in this situation, the logical address in bytes 8–10 will be different than the present physical address of the sector in bytes 5–7. Bytes 11–13 contain a physical address in the spares area where a next sector to be written will be written in case of an address collision or a host-initiated reallocation, both of which will be explained later. The next spares address is initially discovered when the recording media 10 is initialized at spin-up, and is updated dynamically as address collisions and reallocations occur. This provides high replacement access efficiency.

FIG. 9 is a chart of a controller record CR for spares area sectors used for collision recovery. In this type of controller record, bytes 0 and 1 specify that the sector is in the spares area, and is used for address collision recovery, i.e. a sector is written here when a write is attempted in the host area which collides with an already written sector. Bytes 5–10 serve the same purpose as bytes 5–10 in the controller record for host area sectors. Bytes 11–13 store the next available address for a map entry. A map area is also reserved in the recording media 10 for storing map entries. Maps are generated when an address collision occurs. The next map address available is discovered during spin-up when the recording media 10 is initialized.

FIG. 10 is a chart of a controller record CR for spares area sectors used for relocation. In this controller record, bytes 5–13 serve the same function as bytes 5–13 in the controller record for spares area sectors used for collision recovery illustrated in FIG. 9. In this controller record, bytes 2–4 contain the last physical address, if available, of the previous address of the logical sector before this location.

FIG. 11 illustrates a controller record CR for map sectors. Bytes 0 and 1 identify the controller record as a map sector controller record, while bytes 2–4 identify the logical address of the sector in the map area. Logical map sector 0 is located at the highest address in a controller management area. Logical map sectors increase with decreasing physical sector addresses. Bytes 8–10 contain the physical address of the last full map group, if any. Byte 11 contains the number of map entries in this sector. The overall number of map indexes equals 171 minus the number of map entries. Bytes 12 and 13 store the number of map entries currently in the current map group. Each map group is limited to 7,309 entries. Map entries and map indexes are contained in code words of this sector. Each map entry contains the logical sector address and its physical sector address, while each map index contains a three byte field referring to the map index, which is a logical sector address, and another three byte field which refers to the physical sector address for the map sector.

The normal operation of a write procedure according to the present invention is described below with reference to the flow charts of FIGS. 12A through 12B. In a system which permits random access to the surface of the recording media, a write procedure begins with a write transaction being requested. Each write transaction is a request to write a certain number of sectors at predetermined, normally sequential, physical addresses on the recording media 10. In step 100, the write controller determines whether a map of the requested sectors is already in existence. If so, the map is checked to see if the requested sectors have been allocated (step 101). If it is determined that the sectors have already been allocated, the write controller will attempt to write the data in a spares area, as will be described later. If no map exists of the requested sectors, or, if a map does exist but it is determined that the sectors are not allocated (step 101), the operation proceeds to step 102, in which the accumulated slip in the band in which the requested sectors are located is quantified. In step 103, it is determined whether the first sector requested by the write transaction is blank. If the sector is not blank, the operation follows the same procedure as when the mapped sectors are found to be allocated in step 101. This procedure will be discussed later. If the first sector is blank, the status of a predetermined number (i) of following sectors is determined in step 104.

At this time, actual writing onto the surface of the recording media begins. In step 105, a block write start flag is written in the appropriate bytes of the first sector to be written during this write transaction. This prevents this sector from being overwritten in the future by slippage from sectors having lower addresses, etc. The write controller then causes the data for the first sector to be written in the first sector, uses the media certification during write (MCDW) technique described above to detect defects in each code word for this sector, and monitors the reflection from the surface of the media during the write to determine whether the correct data was written. In step 106, the write controller determines whether the write was good or not. Usually, this is performed by comparing the total number of defects found by MCDW in each code word in the sector plus the number of error signals generated indicative of incorrect data having been written with a threshold number of acceptable errors n. In the preferred embodiment, if more than two such errors occur for any code word in a sector, then the sector is rejected as faulty and a slip occurs, as will be described later. If the write is accepted, the operation then proceeds to step 107.

In step 107, the write controller checks whether the transaction has been completed. If the transaction has been completed, the write controller post qualifies the next n sectors (step 108) and awaits the next write transaction request (step 109). The status of the next n sectors is checked on the same rotation of the recording media by the motor following the write in the last sector of the write transaction. Thus, the status of these sectors will already be known for future use, rendering prequalification unnecessary. If the transaction has not been completed, then the write controller prepares to write the next sector of data to be written. This next data is normally intended to be written in the next sequential sector (step 110).

In preparation for writing the next data to be written, the next sequential sector is first checked for a block write start flag indicative of the beginning of a previously written transaction and a potential data overwrite (step 111). The write controller checks bytes 10 and 11 of segment 0 of the sector to be written, and uses the time provided by the blank bytes 12 and 13 of segment 0 to verify the contents of bytes 10 and 11 so as to not lose a rotation while checking on the existence of the flag. If evidence of a potential overwrite (the block write start flag) is found, then the write controller determines whether there would actually be data collision by reading the sector in question. This qualification of the sector costs one rotation of the recording media (step 112). Reading of the sector in question should determine whether or not data has previously been written there. If data has been written in that sector, the data intended for that sector will be written in the spares area, in accordance with a procedure which will be discussed below.

If it is determined in step 112 that no data has been written in the sector in question, the write controller attempts to determine if the host is attempting a logical overwrite (step 113). A logical overwrite has occurred when two sectors have the same logical address. If this is the case, the write transaction is aborted and the host is informed of the error (step 114). If it is determined in steps 112 and 113 that there is no data collision and that the host is not attempting a logical overwrite, then it is likely that the overwrite (block write start flag) detected in step 111 was caused by a defect. In this case, and in the case where no overwrite is detected in step 111, the next data to be written is written in this sector. Simultaneously, the recording media in this sector is checked for defects by MCDW and the intensity of the laser reflection monitored for data verification (step 115). If no more than the threshold number of such errors exist in any code word written in the sector, then the media is considered acceptable and the data verified for the sector, and the write is treated as correct (step 116). The operation described in steps 107 through 116 is then repeated for the remainder of the write transaction. However, if it is determined in step 113 that the write was not successful, or if it is determined in step 113 that the write for any subsequent sector in the write transaction was not successful, then a sector slip will be performed, as described below.

Figure 13:
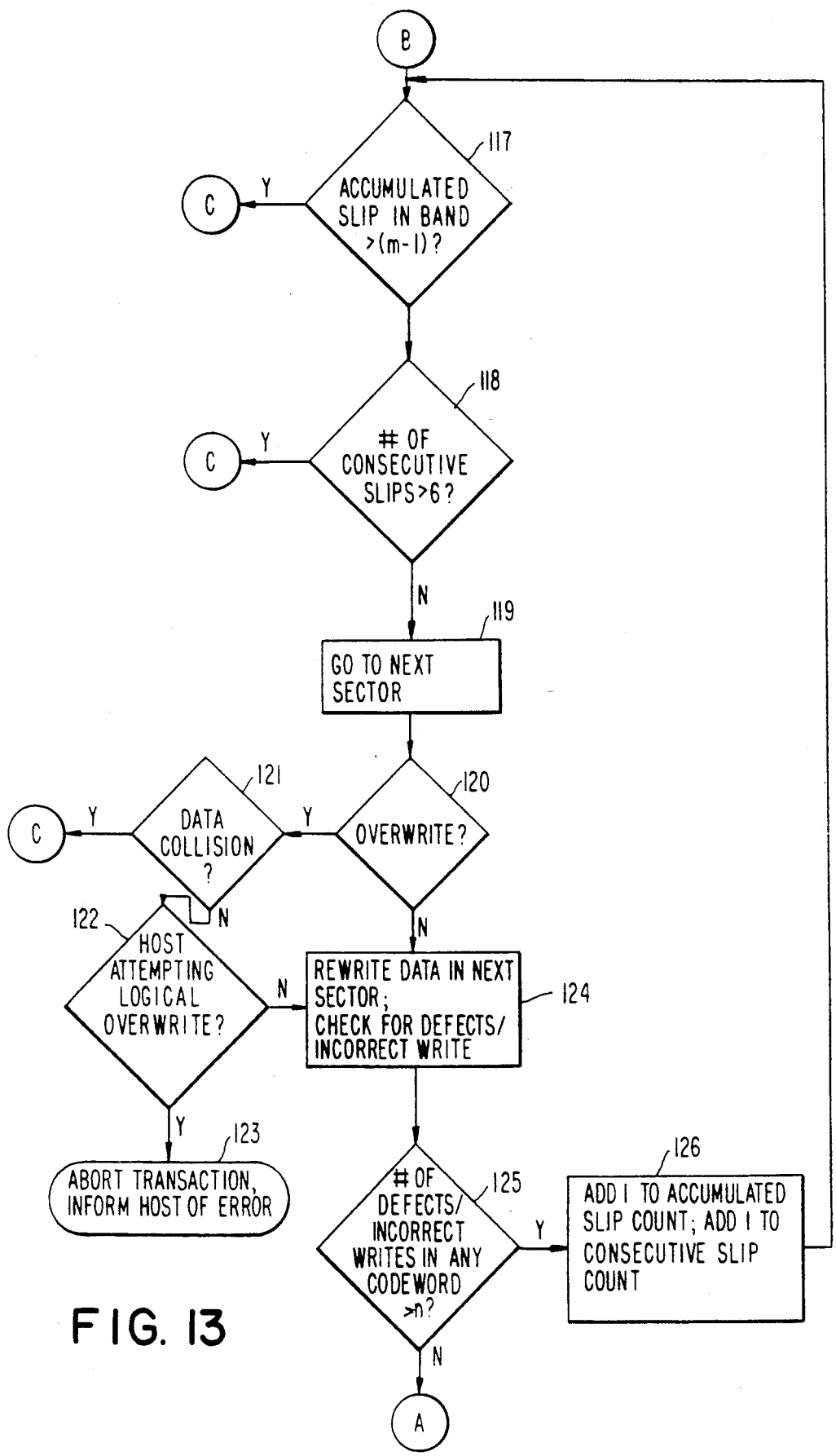
FIG. 13 is a flow chart illustrating the steps to be followed when media defects and/or an improper write require a sector slip.

The flow chart of FIG. 13 illustrates the processing steps to be taken should a sector slip be required. In step 117 the accumulated slip in the band, as quantified in step 102, is checked to see if it is greater than the maximum expected number of slips m for the band, or, more precisely, the maximum expected number of slips less one (m−1), as the quantified accumulated slip has yet to have been incremented for this slip. As described above, the maximum expected number of slips across an entire band in the preferred embodiment is 49. If too many slips have occurred in the band, the data will be written in the spares area. This type of reallocation is discussed below. If the accumulated slip is less than the maximum expected number of slips, it is determined in step 118 whether a predetermined number of consecutive slips have occurred. In the preferred embodiment, only seven consecutive slips are allowed. After this many slips, there is most likely a problem in the recording media or the controlling hardware. In the preferred embodiment, for a host area sector, an attempt will be made to write the data in the spares area after seven slips, which will be described later. Alternatively, the write transaction can be immediately aborted after seven consecutive slips and an alarm given.

Should the number of consecutive slips be less than the maximum number allowed, the next sequential sector in the band is checked for overwrite protection in the form of a block write start flag (steps 119 and 120). The same protocol is used in steps 121 through 123 for checking an overwrite indication as was used above in steps 112 through 114. Once again, should there be no data collision in the sector and if it is determined that the host is not attempting a logical overwrite, or it is determined in step 120 that no overwrite indicator is present in the sector, the write controller writes the data that was intended for the previous sector in this new sector. Like the write described in step 115, the media is concurrently checked for defects and the reflection of the laser beam monitored for data verification purposes (step 124). If it is found in step 125 that there are fewer than the predetermined threshold number of media and data errors in all code words of the sector, then the write is considered acceptable, and the operation returns to step 107 for the next sector to be written in the write transaction, if any (step 120). If there are more than the threshold number of errors in any code word another slip will be attempted. The accumulated slip count and the consecutive slip count are first incremented by one (step 126), and then steps 117-125 are repeated for the next slip attempt.

Figure 12A:
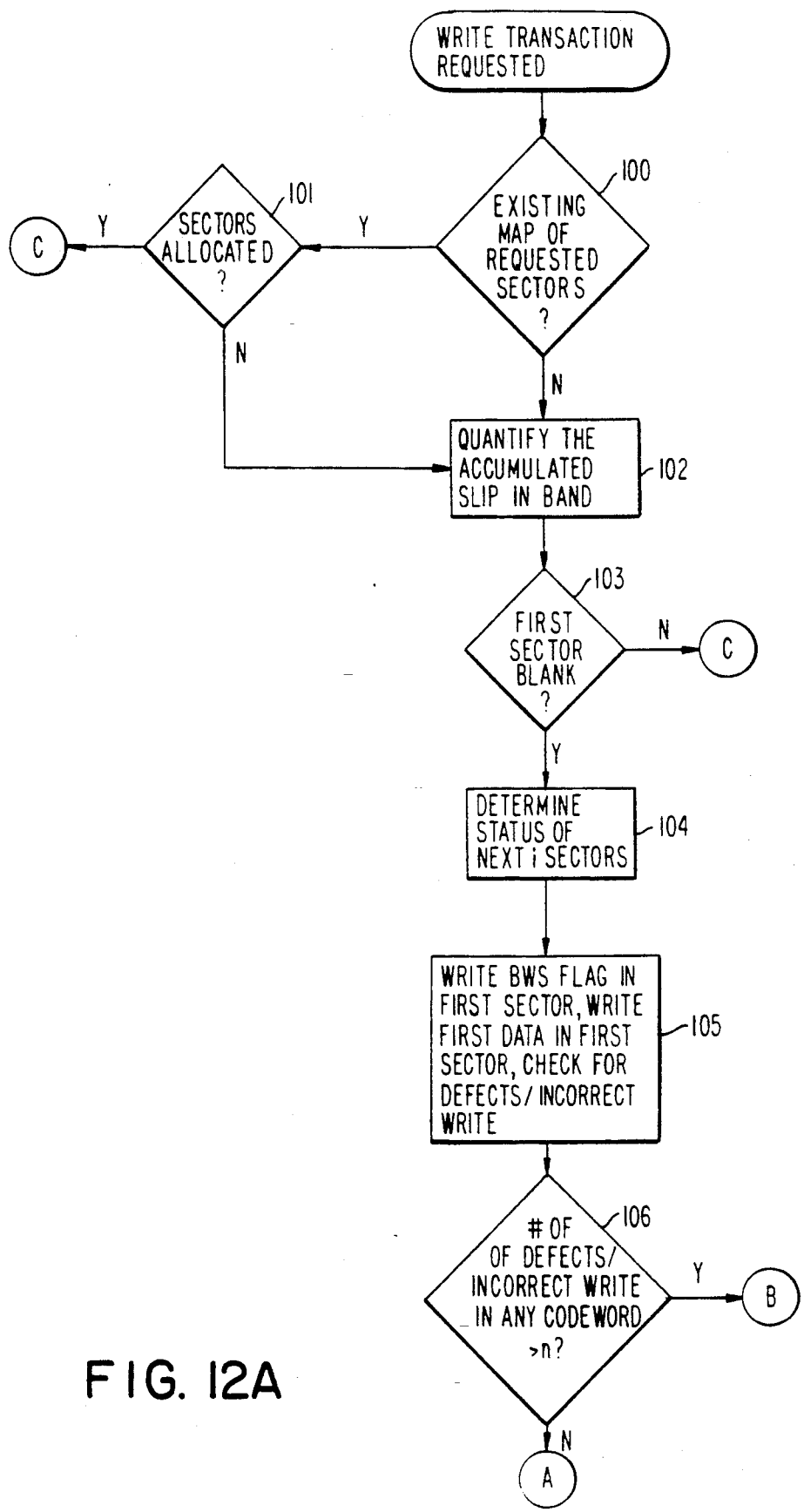
FIGS. 12A-12B are flow charts of the primary processing steps of the present invention.
Figure 12B:
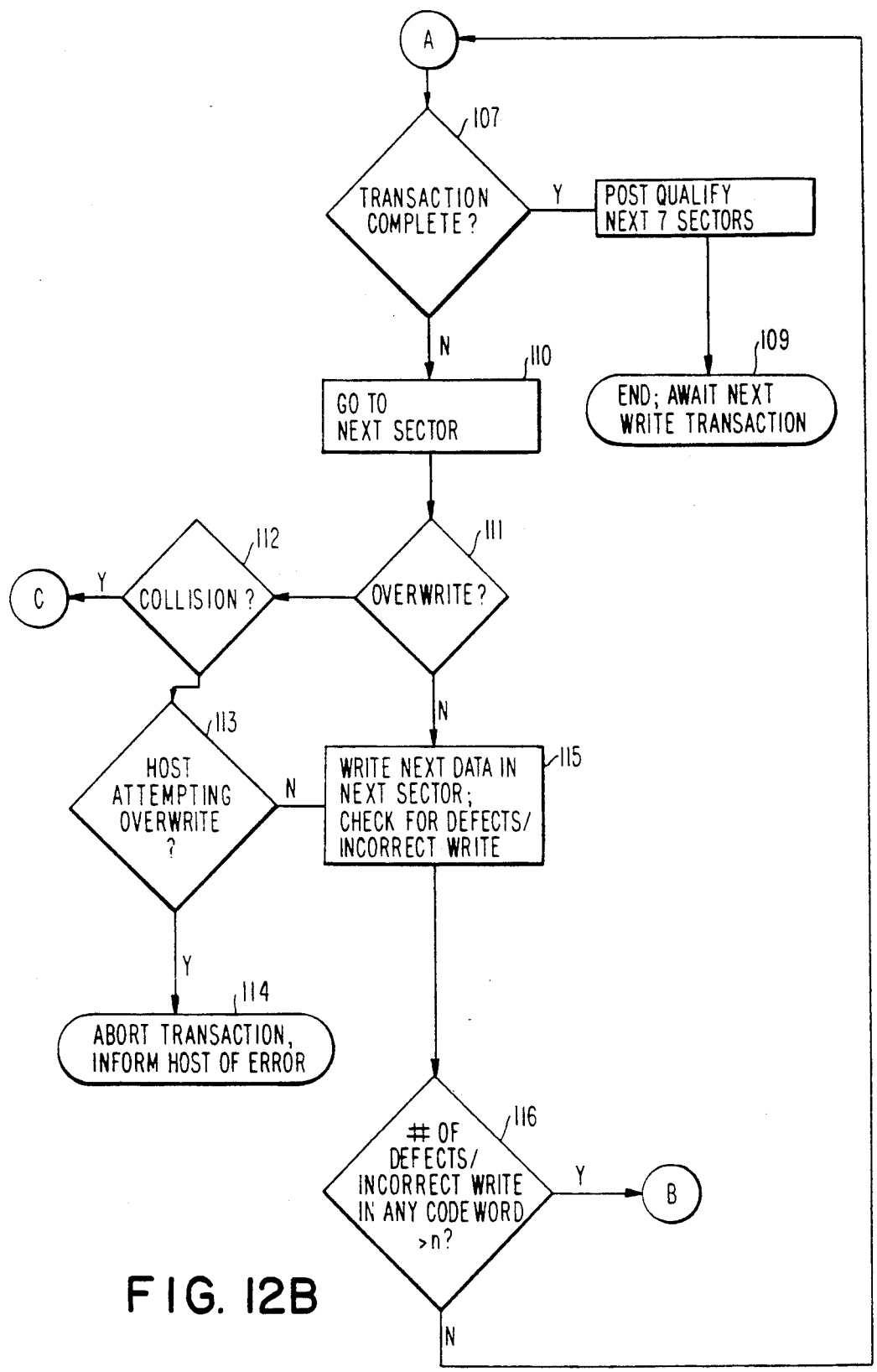

As mentioned briefly above, should any one of a number of events occur during the normal operation illustrated in FIGS. 12A-12B or the sector slip operation illustrated in FIG. 13, an attempt is made to write the remaining data in a write transaction in the spares area of the recording media. These events include a determination in step 101 that the sectors for the write transaction have already been allocated, a determination in step 103 that the first sector for a write transaction is not blank, a determination in step 112 or step 121 that a data collision would occur in a sector to be written, a determination in step 117 that, following a slip, the accumulated slip in the band is greater than a predetermined maximum expected number of slips, and a determination in step 118, following a slip, that more than a predetermined number of consecutive slips have occurred. As discussed above, the address of the next available sector in the spares area is maintained in bytes 11-13 of controller records for host area sectors. As this data is initially discovered at spin-up and updated dynamically as address collisions and reallocations occur, when one of the above events happens, the address of the next available spares area is readily accessible.

Figure 14:
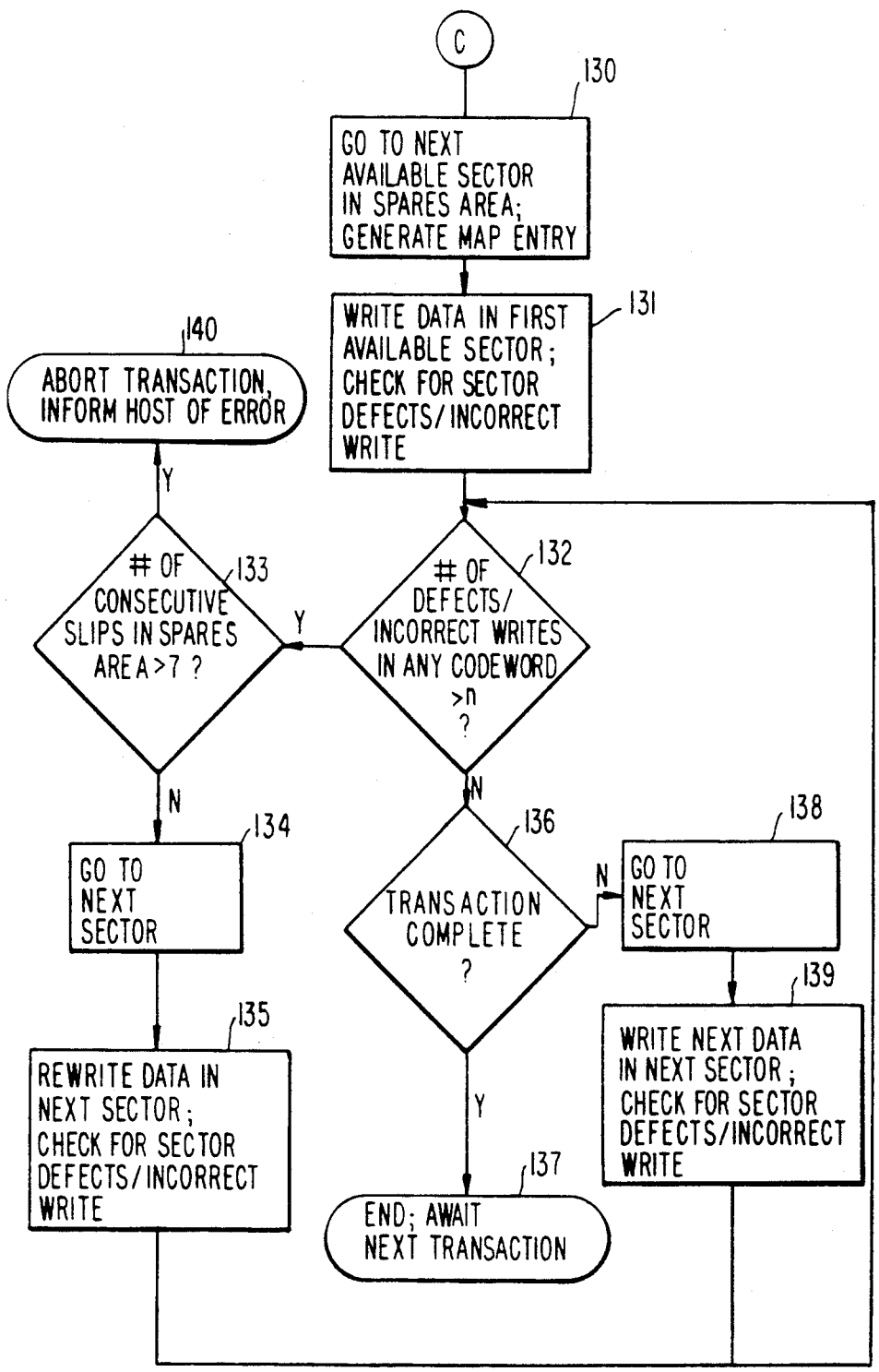
FIG. 14 is a flow chart illustrating the processing steps to be followed when a sector of data is to be written in a spares area.

The flow chart of FIG. 14 illustrates the processing steps for writing sectors of data in the spares area. In step 130, the write controller goes to the next available spares area address after the occurrence of one of the above events. In step 131, the data to have been written in the host area sector is written in the first available sector in the spares area, and just as with any other write, the media is monitored for defects and the reflection of the laser beam is monitored for data verification. Should it be determined that the number of media and data errors for any code word in the sector is greater than the acceptable number in step 132, then a slip is attempted in the spares area. Since the write is sequential in the spares area, no data collisions should be possible. Further, the total number of slips does not matter in the spares area. Accordingly, slipping is simpler in the spares area compared to the slipping performed in the host area (steps 117-126). However, the number of consecutive slips is still monitored. Snould the number of consecutive slips be found to have reached a predetermined number in step 133, then there is a likelihood that there is a problem with either the recording media or the writing equipment. The write transaction is then aborted and the host informed of the error (step 140). In contrast, should the number of consecutive slips be fewer than the threshold number, the data is written in the next sector while the media is certified and the data verified through monitoring of the reflection of the laser beam (steps 134 and 135). The operation then returns to step 132.

When a write is accepted in step 132, it is determined whether the transaction is complete (step 136). If it is not complete, the next data to be written from the write transaction is written in the next sector, and the sector is checked for media defects and the data is verified through monitoring of the reflection of the write pulses (steps 138 and 139). The operation then returns to step 132, in which it is determined if another slip is necessary due to the written data and/or the media being judged to be unacceptable. If this is the case, a slip is performed in accordance with the above described procedures. If not, it is determined whether the write transaction has been completed (step 136). When the write transaction is finally completed, a map entry is generated and the next write transaction is awaited (step 137).

While one embodiment of the present invention has been discussed, it would be appreciated by those skilled in the art that various modifications and variations are possible without departing from the spirit and scope of the invention.

What is claimed is:

1. A method for writing data onto a recording media, comprising the steps of:
    (a) determining whether a sector of the recording media to be written with data contains any previous write;
    (b) writing the data in a spares area and generating a map therefore when the sector contains any previous write;
    (c) writing the data onto the sector and determining whether the sector contains an acceptable number of errors during the write when the sector contains no previous write;
    (d) repeating said method in a next sector for next data when the sector is determined to contain an acceptable number of errors in said step (c); and
    (e) slipping to a next sequential sector when the sector is determined not to contain an acceptable number of errors in said step (c) and repeating said method to attempt to write the data onto the next sequential sector.

2. A method for writing data according to claim 1, wherein the errors include write errors and recording media defects.

3. A method for writing data according to claim 1, further comprising the step of:
    (f) prior to said step (a), pre-qualifying a first sector to be written in as blank during a write transaction in which a plurality of data is to be written into respective sequential sectors.

4. A method for writing data according to claim 1, wherein said step (a) comprises the substeps of:
    (1) determining whether the sector contains an indication of a previous write;
    (2) proceeding to said step (c) if no indication is found;
    (3) reading the sector to determine if data has been written in the sector it the sector contains an indication of a previous write;
    (4) proceeding to said step (b) if data has been written in the sector;
    (5) determining whether a logical overwrite is being attempted if the sector has not been written;
    (6) aborting the writing if it determined that a logical overwrite is being attempted; and
    (7) proceeding to said step (c) if it is determined that a logical overwrite is not being attempted.

5. A method for writing data onto a recording media according to claim 1, wherein the recording media is divided into a predetermined number of bands, each of the bands having a predetermined number of sectors, said method further comprising the step of:
    (g) prior to said step (a), quantifying the number of slips in the band to be written in.

wherein said step (e) further comprises proceeding to said step (b) when the number of slips exceeds a predetermined number.

6. A method for writing data onto a recording media according to claim 5, wherein said step (e) further comprises counting the number of consecutive slips and proceeding to said step (b) when the number of consecutive slips equals a predetermined number.

7. A method for writing data onto a recording media according to claim 5, wherein said step (e) further comprises counting the number of consecutive slips and aborting the write when the number of consecutive slips equals a predetermined number.

8. A method according to claim 1, wherein said step (b) comprises the substeps of:
(1) obtaining an address of a next available sector in the spares area;
(2) writing the data in the next available sector in the spares area and determining whether the next available sector contains an acceptable number of errors;
(3) when the next available sector does not contain an acceptable number of errors, repeating said substep (2) for the data in a next sequential sector in the spares area; and
(4) when the next available sector contains an acceptable number of errors, repeating said substep (2) for next data, if any, in the next sequential sector in the spares area.

9. A method according to claim 1, further comprising the step of:
(h) prior to said step (c), writing an overwrite protection indicator into a portion of the sector for a first sector to be written during a writing transaction.

10. A method according to claim 1, further comprising the step of:
(i) when no data has been written in the spares area, post-qualifying a predetermined number of consecutive sectors following a last sector written during a write transaction.

11. An apparatus for writing data onto a recording media, comprising:
means for determining whether a sector of the recording media to be written on contains previously written data;
means for writing data on the sector of the recording media and detecting defects in the sector and the data being written; and
means for moving the recording media relative to said writing and detecting means, so that said writing and detecting means attempts to write the data in a next sector when the sector or written data is detected to be defective, and attempts to write the data in a spares area of the recording media when said determining means determines that the sector contains previously written data.

12. An apparatus for writing data onto a recording media according to claim 11, further comprising:
means for generating a map entry and writing the map entry onto a predetermined area of the recording media when said determining means determines that the sector of the recording media to be written onto contains previously written data and said moving means moves the recording media relative to said writing and detecting means so as to write the data in the spares area.

13. An apparatus for writing data onto a recording media according to claim 11, wherein the recording media is divided into a predetermined number of bands, each of the bands containing a predetermined number of sectors, said apparatus further comprising:
means for counting the number of times said moving means has moved the recording media relative to said writing and detecting means due to a defect for a given band and causing said moving means to move the recording media relative to said writing and detecting means so that said writing and detecting means attempts to write the data in the spares area when the count exceeds a predetermined number.

14. A media management method for controlling an attempt to write data onto a sector of a recording media, comprising the steps of:
a) writing the data onto a preallocated reserve sector when the sector contains a previous write;
b) writing the data onto the sector and monitoring sector errors during the write when the sector contains no previous write;
c) repeating said step (b) for the data in a next sequential sector when the sector errors are unacceptable; and
d) repeating said method for next data in a following sequential sector from the completed write.

* * * * *